H. TILDEN.
Churn Dasher.
No. 45,194. Patented Nov. 22, 1864.
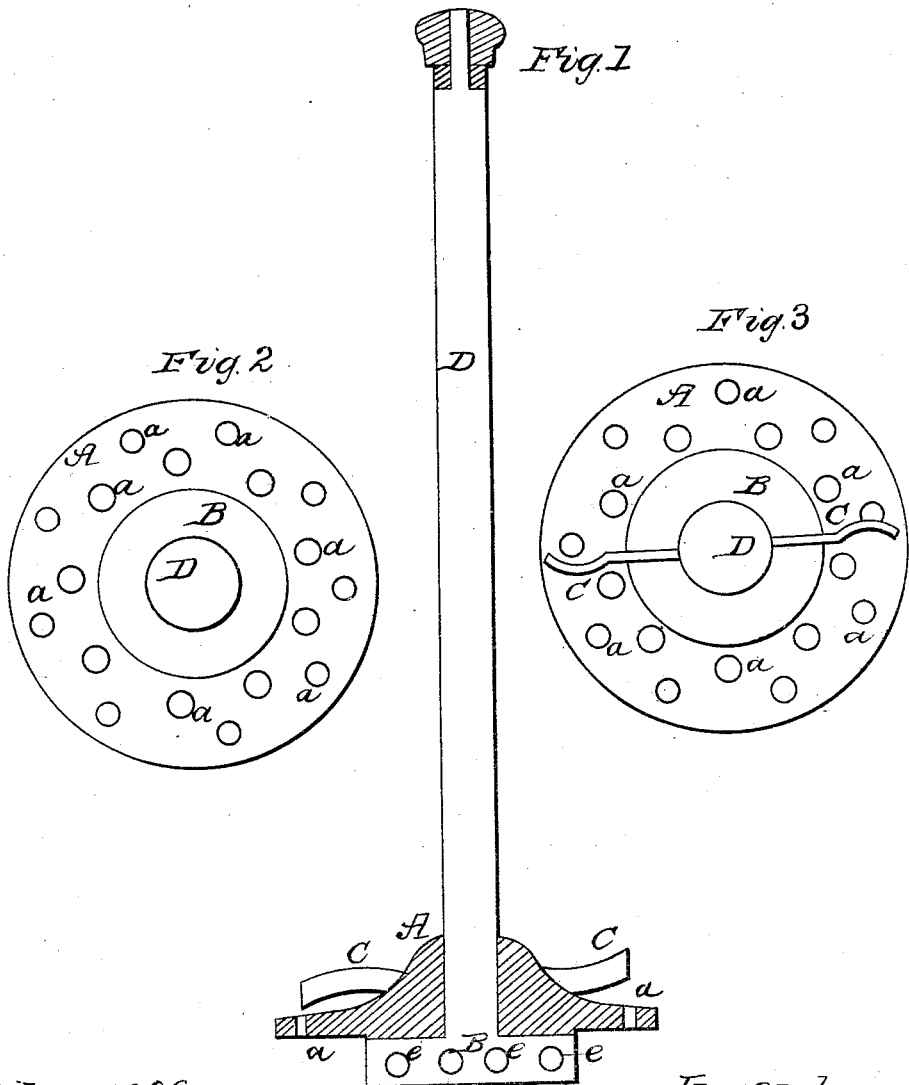

UNITED STATES PATENT OFFICE.

HOWARD TILDEN, OF PHILADELPHIA, PENNSYLVANIA.

IMPROVEMENT IN CHURN-DASHERS.

Specification forming part of Letters Patent No. 45,194, dated November 22 1864.

*To all whom it may concern:*

Be it known that I, HOWARD TILDEN, of the city and county of Philadelphia, and State of Pennsylvania, have invented new and useful Improvements in Churn-Dashers; and I do hereby declare that the following is a full and exact description thereof, reference being had to the accompanying drawings, forming a part of this specification.

Letter A represents the perforated dash-button; B, a rim or disk placed beneath the dash A, as seen in Figure 1; C C', two wings or gatherers for the butter; D, the handle or shaft; *a a a*, &c., perforations in the dash A; *e e e*, &c., perforations in the rim or disk B.

In making butter it is necessary to break all the sacks that contain the granules of butter, or we do not get the whole quantity; but if in doing this we crush the little grains or granules of butter themselves, we have done a great mischief, and made the butter salvy or like lard. To secure the first of these easily and promptly and to avoid the other is the prime object of my invention.

The shaft D being hollow, with a valve at the top for the introduction of air, the object of the disk B is to check the air, and by means of the holes or openings *e e e e*, &c., to give it forcible horizontal direction, and at the same time distribute it equally throughout the bottom of the churn. The arrangement of this disk B is such that each one of the openings *e e e e*, &c., comes directly on a radius passing through the center of the large perforations in the dash-button A.

A further object of the disk B is to prevent the flat or bottom part of the dash A from striking upon the bottom of the churn to crush the granules of butter.

We give the peculiar form and arrangement to the wings C C', so that by turning the dash horizontally in one direction the butter is rolled inward around the shaft, and readily removed to the tray. By turning the dash in the opposite direction the butter is rolled outward. Now, when it is desired to work the buttermilk from the butter while still in the churn, we have only to alternate the two motions above mentioned, and the butter is worked into hard balls, so that it requires but a trifle further labor to fit it for the market.

The curve given to the wings C C', in order to give them the characteristics above ascribed to them, will be readily seen in Fig. 3 of the drawings.

I do not claim the hollow pump-dash in itself, nor do I claim any particular form of air-chamber.

What I do claim, and desire to secure by Letters Patent, is—

1. The combination and arrangement of the perforated disk B with the perforated dash-button A, substantially as described, and for the purposes set forth.

2. The arrangement of the wings C C' in the manner and to act as set forth.

HOWARD TILDEN.

Witnesses:
    DANIEL C. COLBY,
    GREENLEAF STACKPOLE.